US008200476B2

(12) United States Patent
Butterfield et al.

(10) Patent No.: US 8,200,476 B2
(45) Date of Patent: Jun. 12, 2012

(54) MESSAGE FILE EDITING PROCESS

(75) Inventors: Bruce D. Butterfield, Broomfield, CO (US); Jack Shenghong Fu, Broomfield, CO (US); Charles C. Wrobel, Duvall, WA (US)

(73) Assignee: Avaya Inc., Basking Ridge, NJ (US)

( * ) Notice: Subject to any disclaimer, the term of this patent is extended or adjusted under 35 U.S.C. 154(b) by 1673 days.

(21) Appl. No.: 10/980,230

(22) Filed: Nov. 4, 2004

(65) Prior Publication Data

US 2006/0095774 A1   May 4, 2006

(51) Int. Cl.
G06F 17/28 (2006.01)
G06F 17/20 (2006.01)
(52) U.S. Cl. .................. 704/8; 704/2; 704/3; 704/4
(58) Field of Classification Search ............... None
See application file for complete search history.

(56) References Cited

U.S. PATENT DOCUMENTS

| | | | | |
|---|---|---|---|---|
| 5,724,425 A * | 3/1998 | Chang et al. | ...................... | 705/52 |
| 5,859,967 A * | 1/1999 | Kaufeld et al. | ................... | 726/5 |
| 5,907,326 A * | 5/1999 | Atkin et al. | ................... | 715/866 |
| 6,092,036 A * | 7/2000 | Hamann | .......................... | 704/8 |
| 6,275,978 B1 * | 8/2001 | Bell | .............................. | 717/143 |
| 6,429,882 B1 * | 8/2002 | Abdelnur et al. | ............. | 715/763 |
| 6,513,121 B1 * | 1/2003 | Serkowski | ....................... | 726/29 |
| 6,567,973 B1 * | 5/2003 | Yamamoto et al. | ........... | 717/136 |
| 6,735,759 B1 | 5/2004 | Yamamoto et al. | | |
| 6,785,815 B1 * | 8/2004 | Serret-Avila et al. | ......... | 713/176 |
| 6,983,451 B2 * | 1/2006 | Colaiuta | ....................... | 717/125 |
| 7,272,406 B2 * | 9/2007 | Chava et al. | .................. | 455/466 |
| 7,574,606 B1 * | 8/2009 | Fan et al. | ....................... | 713/179 |
| 7,596,777 B2 * | 9/2009 | Fallen-Bailey et al. | ........ | 717/103 |
| 2002/0144253 A1 * | 10/2002 | Kumhyr | ........................ | 717/170 |

OTHER PUBLICATIONS

Notice of Allowance for Canadian Application No. 2,487,687 mailed Oct. 16, 2009.
Author Unknown, "Want to Make Your Software Really Multilingual?", Multilizer: The Software Globalization Company, as early as Dec. 2, 1998, pp. 1-2, available at http://www.multilizer.com/.
Author Unknown, Alchemy Language Exchange: High Performance Internet Enabled Translation Memory Server, Alchemy Software Development, as early as Jul. 7, 2001, pp. 1-3, available at http://www.alchemysoftware.ie/products/alchemy_language_exchange.html.
Canadian Intellectual Property Office, Office Action for Canadian Application No. 2,487,687 mailed Jun. 26, 2008.
Background of the Invention for the above Captioned application (previously provided).

* cited by examiner

*Primary Examiner* — Talivaldis Ivars Smits
*Assistant Examiner* — Jesse Pullias
(74) *Attorney, Agent, or Firm* — Sheridan Ross P.C.

(57) ABSTRACT

A system for facilitating the translation of messages from an original language to a language preferred by an end user is provided. The system allows distributors, end users or others to create translated versions of messages used by an application program, while protecting against changes that might affect operation of the application program. More particularly, a new message editor application ensures that proper formatting of messages is utilized, and protects verified messages against unauthorized editing using a data conformance stamp. Before applying a new message, the application program recreates the data conformance stamp to ensure that the new message has not been altered outside of the message editor application.

20 Claims, 7 Drawing Sheets

MESSAGE FILE EDITING PROCESS

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present invention relates to the editing of message files used in connection with the execution of application programs.

BACKGROUND OF THE INVENTION

Application programs often use message files containing text that may be displayed to a user at appropriate times during execution of the application program. In connection with application programs that will be used by persons who speak different languages, it is often desirable to translate message text into the languages of the different users.

The cost associated with translating message text, known as localization costs, can be high. In general, translations will only be provided for markets determined to have a good return on investments. As a result, smaller markets are often left using application programs that use messages expressed in a non-native language (typically English). However, if application programs that used local languages were readily available, such application programs would have the potential to become more successful in non-English speaking countries.

In order to shift and/or minimize the expense of creating local versions of application programs, developers can allow partners, distributors or even customers to translate software messages into local languages. However, the unrestricted modification of message files can introduce many problems. For example, in connection with application programs used in connection with the control of embedded devices or other hardware, or in connection with text messages displayed as part of graphical user interfaces, messages often must be limited to some maximum length. In addition, many messages contain dynamic or control variables. If such variables are changed, deleted, added, or reordered, problems with the operation of the application program will arise. Specifically, the application program may work improperly or not at all.

Localization tools are available that can be used to facilitate the proper translation of software messages. For example, translation programs that prevent translated text from exceeding a specified maximum length are available. However, most application programs require a specific format, such as a plain text file, in order to use the translated message. Accordingly, translated messages formatted in connection with conventional message translation programs must be exported and saved according to the application software requirements. After the translated messages have been saved in the required format, there is a potential for direct edits of the resulting file. Direct editing of the message file bypasses the editing tools, therefore allowing errors such as exceeding the specified maximum message length to occur. Furthermore, conventional message translation tools do not provide the capability to protect dynamic and control variables from being added, changed, deleted or reordered.

SUMMARY OF THE INVENTION

The present invention is directed to solving these and other problems and disadvantages of the prior art. In accordance with embodiments of the present invention, an editor for validating and enforcing proper message file format is provided. Format parameters that can be enforced include maximum message length, and the maintenance and ordering of required variables. After new or translated message text has been entered by a user and validated as conforming with applicable parameters associated with that particular message, a data conformance stamp is associated with the new message text, and a new message file containing the new message text and the associated data conformance stamp is created. An application program, upon receiving the new message file, will recalculate a data conformance stamp for the new message text included in the new message file. If the recalculated data conformance stamp differs from the data conformance stamp created by the message editor, alteration of the new message file outside of the message editor is indicated, and the application program will reject the new message file. Alternatively, if the data conformance stamps are the same, the application program will accept the new message text.

In accordance with embodiments of the present invention, the message editor includes or has access to message format parameters associated with each message associated with an application program. In accordance with further embodiments of the present invention, the message editor may display the message text for each message associated with an application program. By selecting a message displayed by the message editor, a user may enter translated or otherwise new message text. Furthermore, edits may be made in an edit box located adjacent to the original message. In accordance with embodiments of the present invention, the displayed original message may include any variables associated with that message. In accordance with still other embodiments of the present invention, the edit box may contain the original message text, including any variables, in the original language, which can then be altered as desired by the user, provided such alterations comply with applicable message parameters. Accordingly, required variables are already presented to the user and ready for incorporation into a translated message.

In accordance with still other embodiments of the present invention, information related to a selected message may be displayed to the user. Such information may include an identifier for the message, the maximum number of characters for the message, the required message format, the original message text, and the currently entered translated text.

In accordance with embodiments of the present invention, the data conformance stamp associated with new message text by the message editor is calculated by using an algorithm to create a checksum of the new message text. A hidden key is then applied to the checksum, to create the data conformance stamp that is included in the new message file containing the approved new message text. Similarly, the application program attempts to recreate the data conformance stamp by first applying the same algorithm used to create a checksum based on the approved new message text to the new message text as received with the new message file. The application program then applies the hidden key to the resulting checksum to create a data conformance stamp. If the text received as part of the new message file has been altered outside of the message editor, so that it does not match the approved new message text, the data conformance stamp created by the application program will not match the data conformance stamp created by the message editor. If the data conformance stamps do not match, the new message file is rejected by the application program. If the data conformance stamps do match, the new message text received as part of the new message file will be used as appropriate by the application program during execution of that program.

Additional features and advantages of the present invention will become more readily apparent from the following discussion, particularly when taken together with the accompanying drawings.

DETAILED DESCRIPTION

Figure 1:
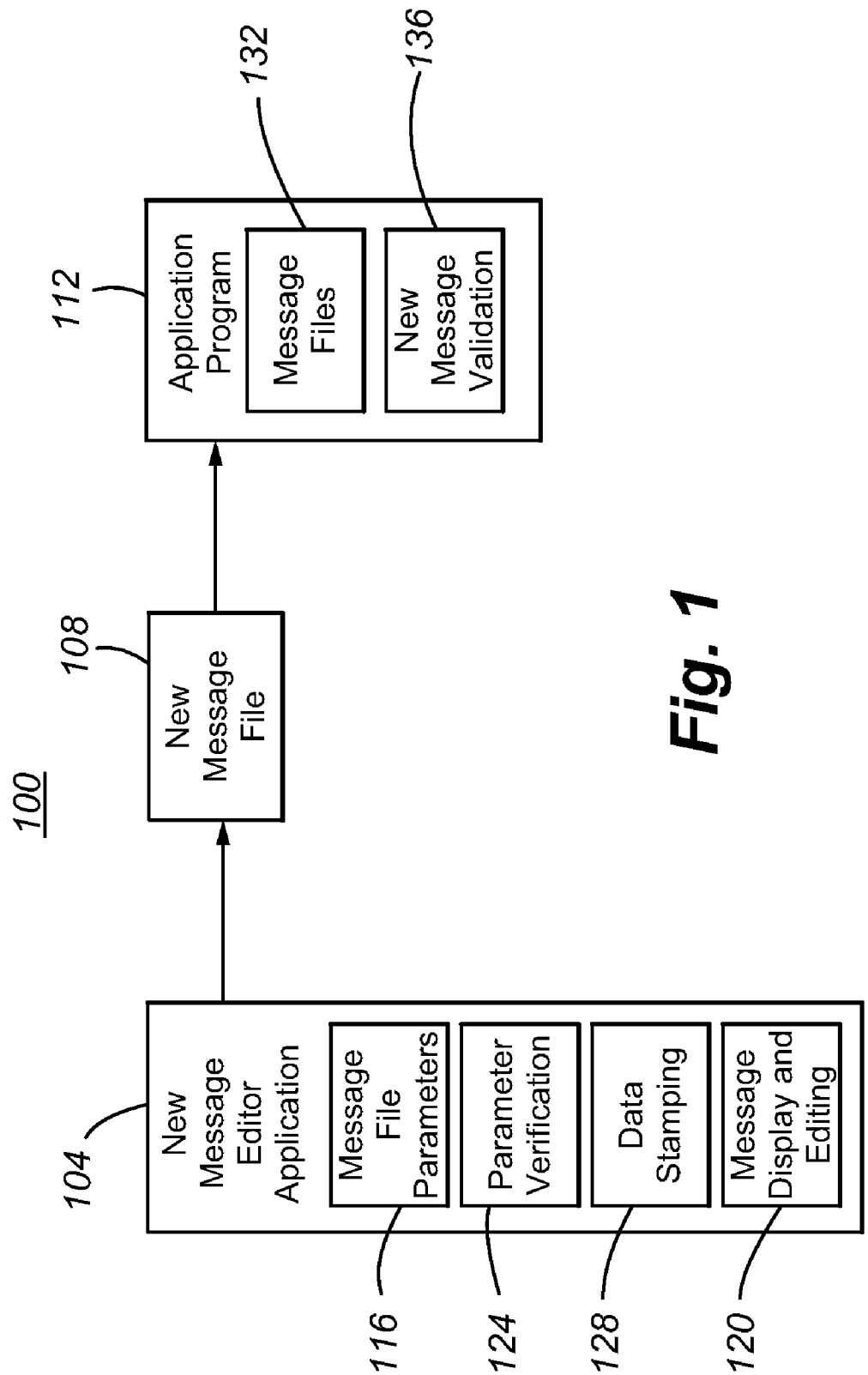
FIG. 1 is a block diagram depicting a system in accordance with embodiments of the present invention.

With reference now to FIG. 1, a system 100 for preparing new software message text in accordance with embodiments of the present invention is illustrated. As used herein, new message text may refer to software messages that have been translated into a language other than the original language of the message, or that have otherwise been altered. In general, the system 100 includes a new message editor application 104 that is used to generate a new message file 108 that contains new message text entered by a user and that has been verified to comply with applicable formatting parameters. In addition, the system 100 includes an application program 112 that makes use of messages. A new message file 108 may, in addition to text, include dynamic or control variables, hereinafter referred to as variables, as may be required by the formatting parameters for the particular message.

In accordance with embodiments of the present invention, the new message editor application 104 may be implemented as a software application running on a general purpose computer, as will be described in greater detail elsewhere herein. New message files 108 created by the new message editor application 104 may comprise new message text and variables formatted as required by the application program 112. For example, a new message file 108 may comprise a plain text file.

The application program 112 may comprise application software running on a general purpose computer or on a device running the application program 112 as embedded software or firmware. Accordingly, an example of an application program 112 includes a software application that controls the operation of a telephone capable of displaying text associated with the operation of the telephone. Other examples of embedded devices that may be associated with an application program 112 include cellular telephones and personal digital assistants (PDAs). Furthermore, an application program 112 may be associated with overall control of an associated device, or with certain functions or capabilities provided to a user of the associated device.

The new message editor application 104 may include a number of modules or functions. These include the storage of message file parameters 116. Message file parameters 116 contain the parameters for each editable message associated with a particular application program 112. Accordingly, a new message editor application 104 that is dedicated for use in connection with a particular application program 112 may maintain a set of message file parameters 116 appropriate to that application program 112. Furthermore, a message editor application 104 that can be used in connection with a number of different application programs 112 may contain different sets of message file parameters 116 for use with the different application programs 112. Alternatively or in addition, message file parameters 116 may be loaded by a new message application 104 each time a user chooses to edit messages associated with a different application program 112. In such embodiments, message file parameters 116 may be obtained from the appropriate application program 112, or from another authority. As can be appreciated by one of skill in the art after consideration of the present disclosure, message file parameters 116 may comprise a template for each message associated with an application program 112.

A message display and editing function or module 120 may also be provided as part of a new message editor application 104. In accordance with embodiments of the present invention and as will be described in greater detail elsewhere herein, the message display and editing module 120 may display the original text of a message selected for editing, and any parameters associated with that message. In addition, the message display and editing module 120 can receive new message text entered by a user.

A parameter verification function or module 124 generally receives input from the message file parameters 116 and the message display and editing 120 modules. In particular, the parameter verification function 124 operates to verify that new message text entered by a user through the messaging display an editing module 120 conforms with required parameters associated with the message, as set forth in the message file parameters 116.

The data stamping function or module 128 of the new message editor application 104 creates a data stamp or digital signature from new message text that has been approved by the parameters verification function 124. As will be described in greater detail elsewhere herein, the data stamp may be created by applying a hidden key known to the new message application 104 and the application program 112 to a checksum derived from new message text that has been verified by the parameter verification function 124.

The application program 112 also generally includes message files 132. The message files 132 contain text displayed by an associated computer or device at appropriate points in the execution of the application program 112. Furthermore, the message files 132 may contain variables, including dynamic and control variables, for example for the display of dynamic information or the receipt of control inputs. Furthermore, the message files 132 may include original message files, containing text that may, for example express messages to a user in a first language. Alternatively or in addition, for example, after new message files 108 have been received, the message files 132 may contain text that express messages to a user in a second language.

The application program 112 may also include a message validation function or module 136. The new message validation function or module 136 of the application program 112 is used to verify that new message files 108 have been verified by the new message editor application 104, before the application program 112 will accept a new message file 108 for inclusion in the message files 132 applied at run time of the application program 112. As will be described in greater detail elsewhere herein, a new message file 108 may be validated by applying the hidden key known to the new message editor application 104 and the application program 112 to a checksum derived from the new message text received as part of a new message file 108, to obtain a data conformance stamp. If the data conformance stamp created by the new message validation function 136 matches the data conformance stamp associated with the new message file 108 by the new message editor application 104, the new message file 108 will be accepted for inclusion in the message files 132 of the application program 112. Alternatively, if the data conformance stamp created by the new message validation module 136 does not match the data conformance stamp created by the new message editor application 104, the new message file 108 will be rejected.

Figure 2:
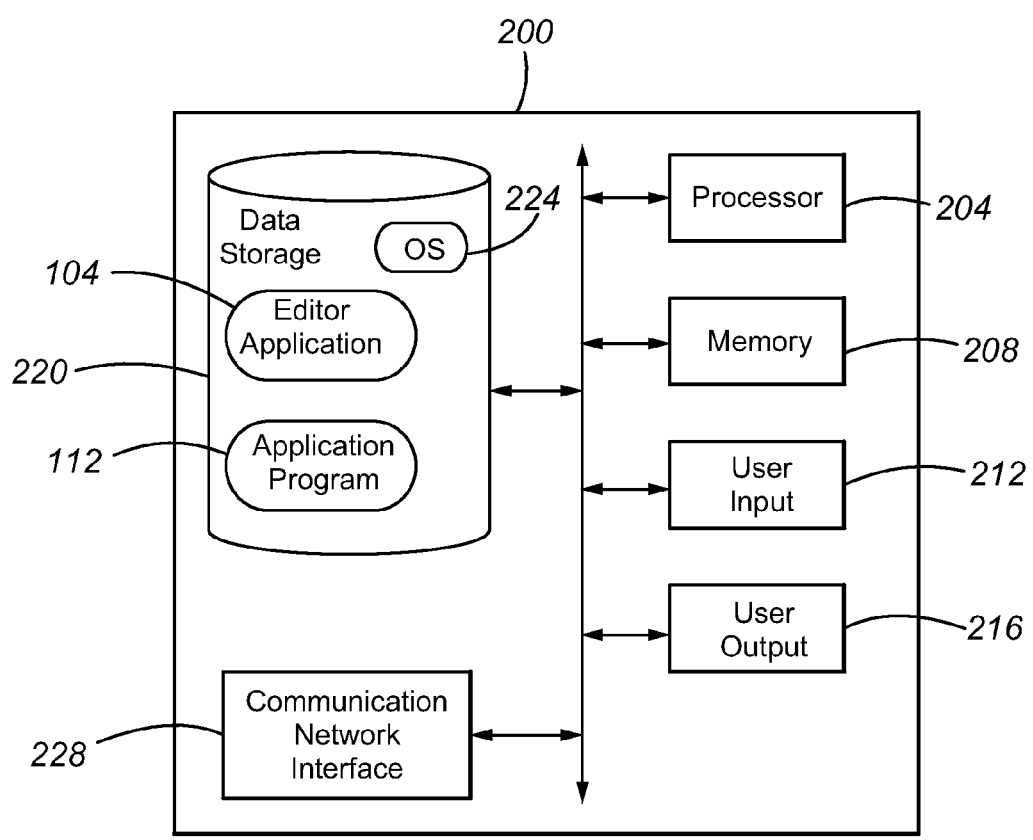
FIG. 2 is a block diagram of a processing device comprising at least portions of a system in accordance with embodiments of the present invention.

With reference now to FIG. 2, components of a general purpose computer or other device 200 running a new message editor application 104 and/or a general purpose computer or embedded device 200 running an application program 112 in accordance with embodiments of the present invention are depicted. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various of the functions provided by the new message editor application 104 and/or the application program 112.

Memory 208 which is a computer readable medium, may be included for use in connection with the execution of programming by the processor 204, and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a keyboard, numeric keypad, microphone, dedicated function keys, and pointing device combined with a screen or other position encoder. Examples of user output devices 216 include a liquid crystal display (LCD), cathode ray tube (CRT), indicator lights, speaker, ringer or printer port.

Data storage 220 may be provided for the storage of application programming and/or data. For example, operating system software 224 may be stored in the data storage 220. Examples of applications that may be stored in the data storage 220 include the new message editor application 104 and the application program 112, including any modules associated with the editor application 104 and/or application program 112.

A communication network interface 228 may also be provided. Examples of a communication network interface 228 include a network interface card (NIC) for interconnecting the associated device 200 to a computer network such as a local area network (LAN) or wide area network (WAN). Alternatively or in addition, the computer network interface 228 may comprise an interface to the public switched telephony network (PSTN), or to a cellular or other wireless network.

Figure 3A:
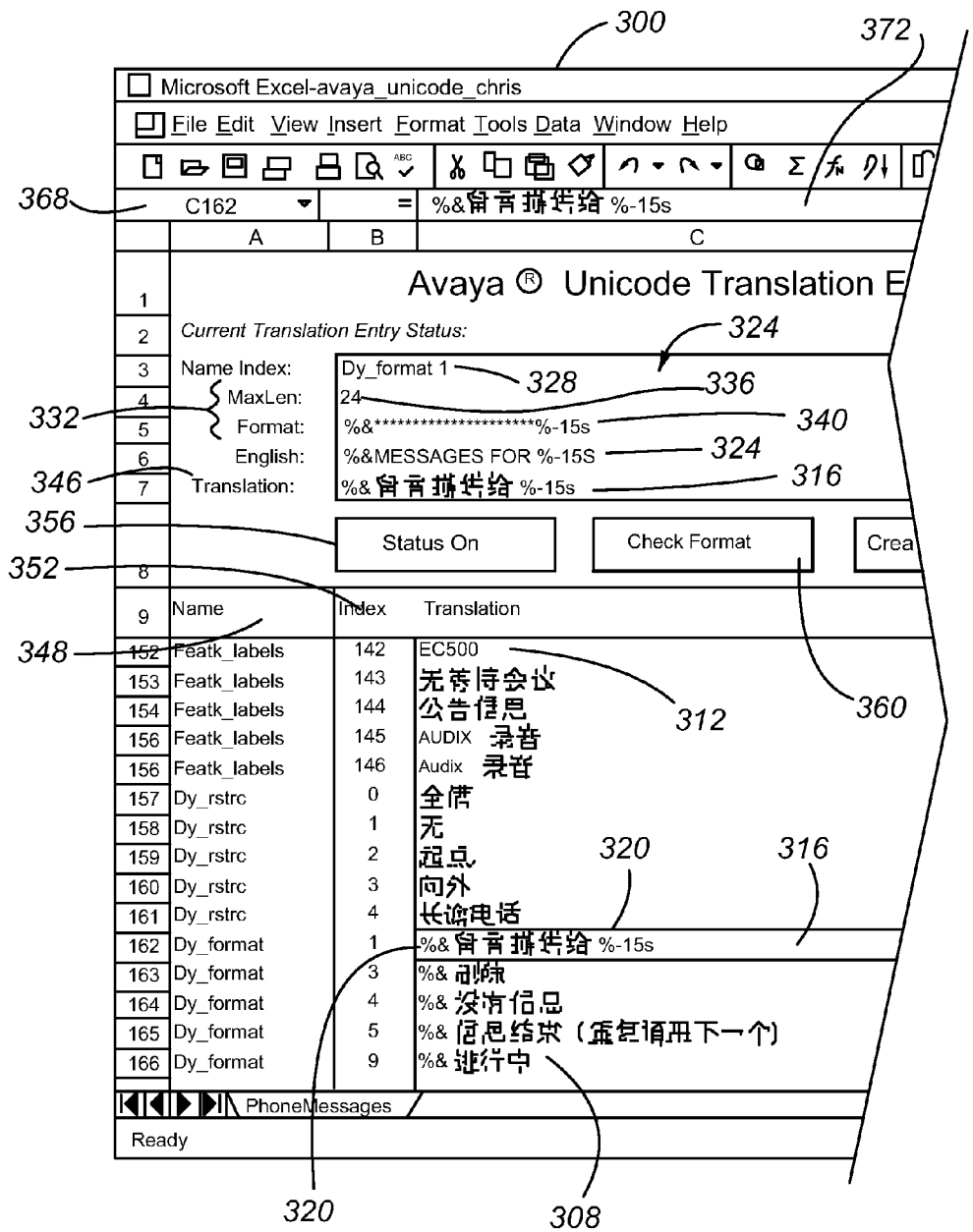
FIGS. 3A and 3B are screen shots of a message editor in accordance with embodiments of the present invention.
Figure 3B:
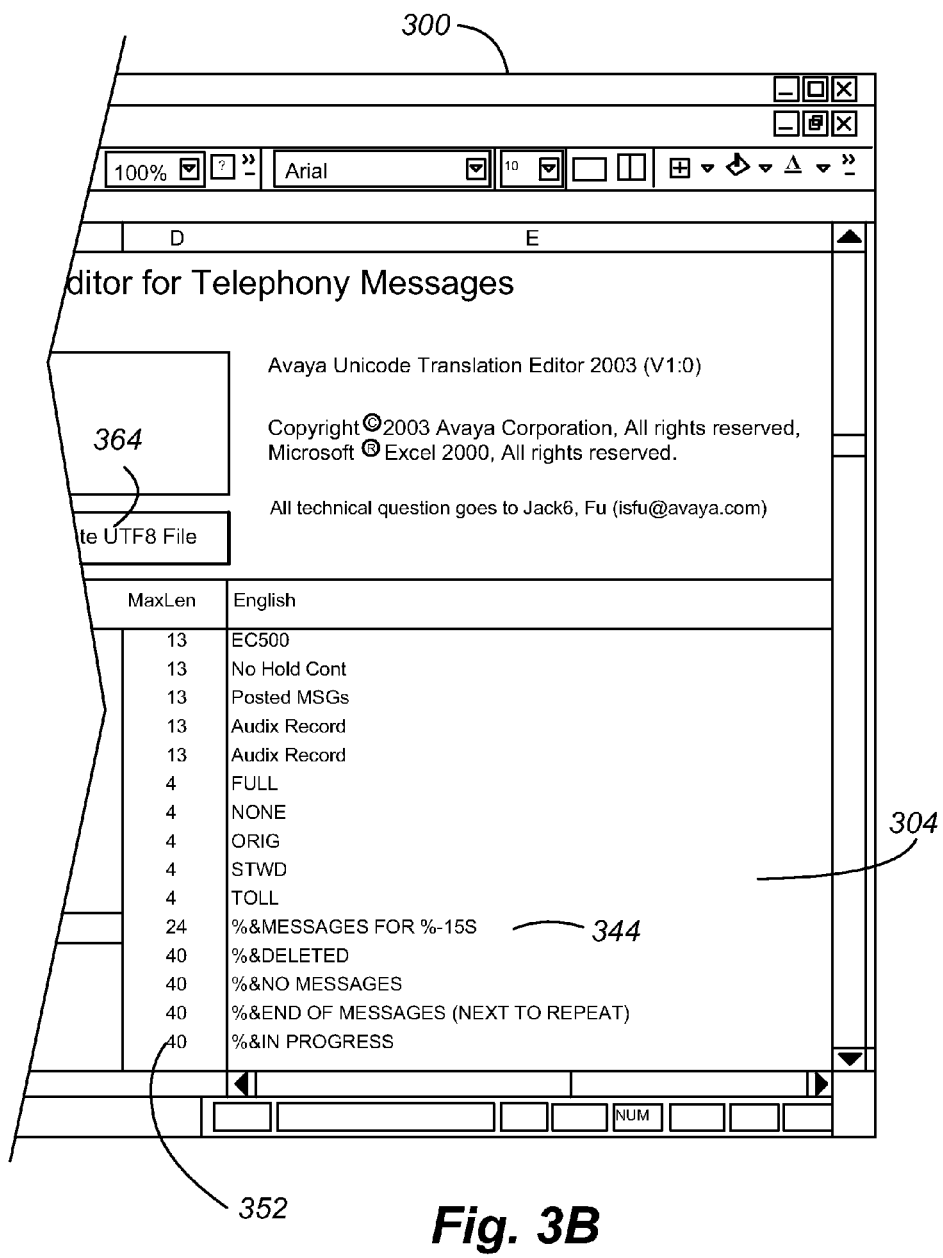

With reference now to FIGS. 3A and 3B, are screen shots of the user interface 300 associated with a new message editor application 104 in accordance with embodiments of the present invention is depicted. In general, the user interface presents a listing of the message files 132 in their original language or format in an original message text column 304. In addition, a translated message column 308 displays translated versions of the messages. For those messages that have not been edited by the user, the translated messages column 308 displays the original message. For example, in the first line of displayed messages 312, both the original messages column 304 and the translated messages column 308 display the same message text. Accordingly, before a user has made any edits to messages, the translated message text column 308 displays the same text as the original message column 304.

By selecting a message displayed in the new message text column 308, the user may make edits to the original message. For example, highlighted line 316 in the example user interface 300 is currently selected for editing. The selected message 316 includes a number of control characters 320. The control characters included in the highlighted text 316 are identical to the variables shown in the original message. However, the static text of the message (i.e., the portion of the message not comprising a dynamic variable or a control variable) has been translated from the original message to, in the present example, a Chinese translation of that message. Furthermore, in order to enter the translated text, the user simply deleted the original English language message displayed in the new message file text column 308, and entered the translated version of that text.

Other information that may be displayed by the graphical user interface 300 includes status information regarding the selected message, displayed in a selected message status area 324. Information displayed in the current message status area 324 may include the name index 328 and parameters 332 associated with the selected message, such as a maximum length for the message 336 and the message format 340. The message format information 340 may include any required variables and the order of those variables. Furthermore, the format information 340 may indicate a required relationship between control variables and user definable text. For instance, in the example shown in FIGS. 3A and 3B, the format consists of a first control variable "&" followed by a text area having space for up to twenty-four characters, corresponding to the maximum length parameter, followed by a second control character "%-15s". The status area 324 may also display the original message 344 and the translated version of the message 316 that is currently selected in a translation field 346.

Other information may also be displayed in additional columns. For example, a name column 348 may be provided for displaying the name or label for the class or type of message to which each of the displayed messages belong. An index column 352 may also be provided, to provide a particular designation for each message within the class or type indicated in the name column 348. For the convenience of the user, the maximum length permitted for text associated with each message may also be displayed in a maximum length column 352.

Various radio buttons, icons and menu items may also be made available to the user for use in connection with operation of the new message editor application 104. For example, a "status on" button 356 may be provided to allow the user to select or alternatively deselect the display of the currently selected message status field 324. In addition, a "check format" button 360 may be provided to allow a user to have the new message editor application 104 check the format of a selected translated message before the user actually creates a new message file 108. A "create file" button 364 may be provided to allow a user to create a new message file 108 suitable for delivery to an application program 112 that includes one or more selected messages.

In accordance with embodiments of the present invention, the new message editor application 104 may be implemented in connection with existing software applications, such as spreadsheets. For example, the new message editor application 104 may be implemented by suitable modification to the Microsoft Excel™ program, for example through macros or plug-ins. Accordingly, the graphical user interface 300 may display controls associated with that program, such as a cell identifier information block 368 and a cell contents line 372.

Figure 4:
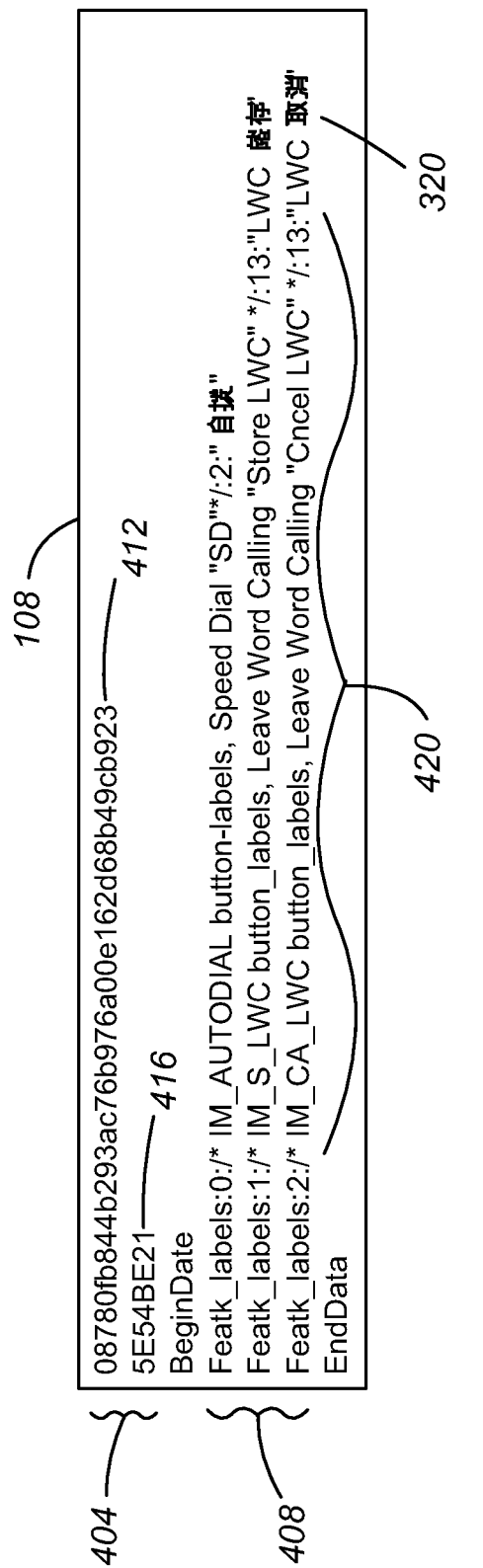
FIG. 4 depicts a new message file in accordance with embodiments of the present invention.

With reference now to FIG. 4, the contents of a new message file 108 in accordance with embodiments of the present invention is illustrated. In general, the new message file 108 is comprised of header 404 and data 408 sections. The header section 404 displays the checksum 412 calculated or derived from the data 408 included with the new message file 108. In addition, the header information 404 includes the data conformance stamp 416 created by applying a hidden key to the checksum value 412.

The data section 408 generally includes name and index information identifying each message included in the new message file 108. In addition, information describing the message 420 may be provided. Finally, the new or translated text 320, including any variables associated with the message, is included for each message incorporated in the new message file 108.

Accordingly, a single new message file 108 may contain one or more new messages for use by an application program 112. Furthermore, the application program 112 can identify each new message based on the information included with a new message file 108. In still another aspect, the application program 112 can verify that the format of the new message will be compatible with the application program 112 by ensuring that the data in the new message file 108 as received results in creation of a data conformance stamp that is identical to the data conformance stamp 416 that was created by the new message editor application 104 and that is provided as part of the header information 404.

Figure 5:
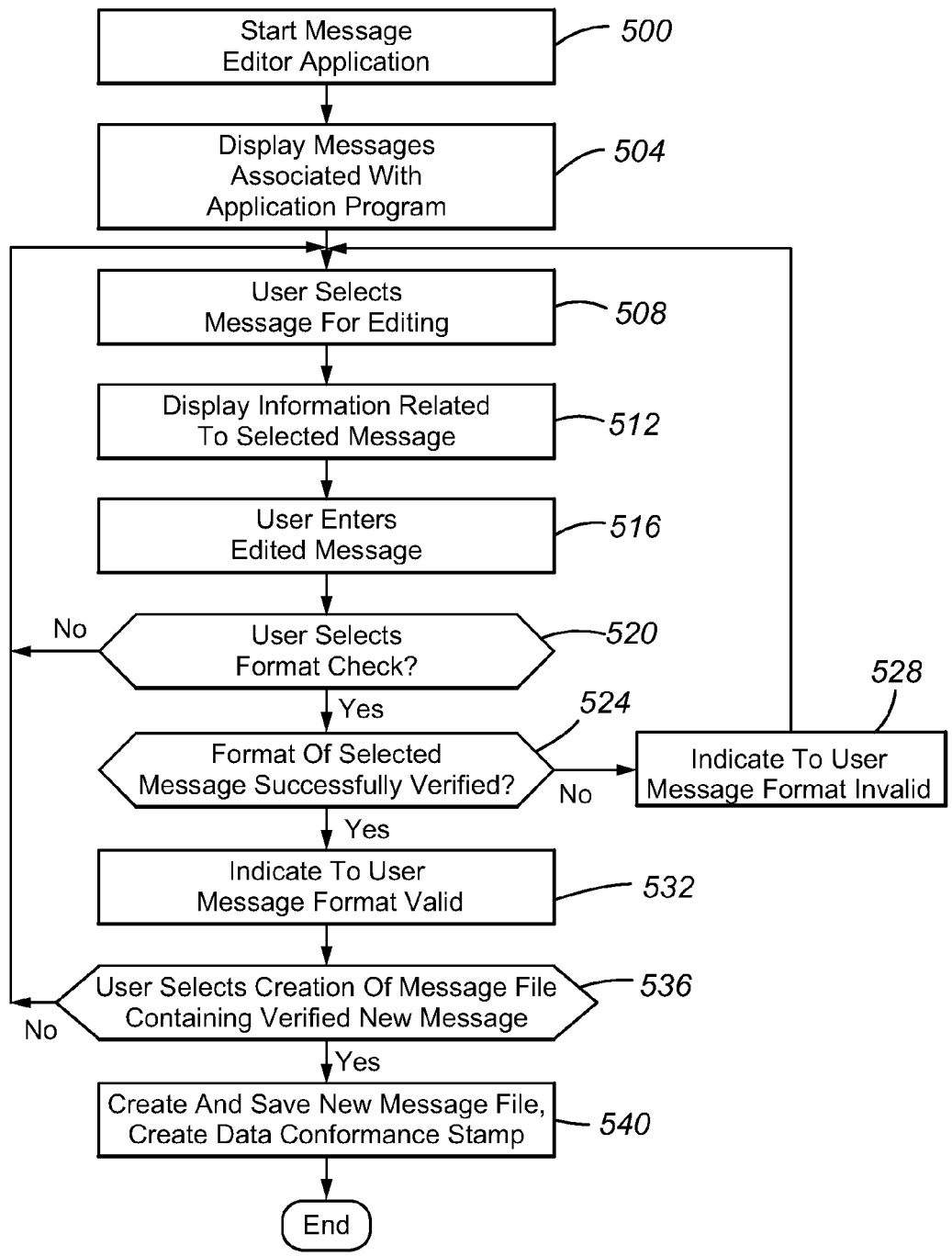
FIG. 5 depicts aspects of a process for creating a new message file in accordance with embodiments of the present invention.

With reference now to FIG. 5, aspects of the operation of a system 100 in connection with creating a new data file 108 are illustrated. Initially, in step 500, the user starts the new message editor application 104. The new message editor application 104 may be dedicated for use in connection with a particular application program 112. Alternatively or in addition, the user may specify to the new message application 104 the application program 112 for which new or translated messages are to be created. The new message editor application 104 then displays messages associated with the application program 112 (step 504). In accordance with embodiments of the present invention, the message files 132 may be obtained from the particular application program 112 in association with which messages are to be edited.

At step 508, the user selects a message for editing. Information relating to the selected message is then displayed 512, for example in the currently selected message status area 324 of the graphical user interface 300. In addition, as noted above, information related to at least some of the messages associated with an application program 112 may be displayed as part of a listing of messages by the graphical user interface 300.

The user then enters an edited message, for example in the highlighted area 316, or in the cell contents area 372 of the graphical user interface (step 516). At step 520, a determination may be made as to whether the user has selected the check format button 360 or feature of the new message editor application 104. If the user has not selected the check format feature, the process may return to step 508 and the user may continue to edit the same or other of the messages. If the user does select the check format feature, the format of the selected message is checked and a determination is made as to whether the format has been verified as correct (step 524). Checking the format of a selected message includes ensuring that the new message complies with parameters defined for that message. Such parameters may include a maximum message length, and ensuring that any variables associated with the message have not been changed, deleted, added or reordered. If the format of the selected message is not successfully verified, an indication is provided to the user that the message format is invalid (step 528), and the process may return to step 508 for additional editing. After all invalid messages have been corrected, a message indicating no errors found will be provided to the user when the file is checked. (step 532).

A determination is then made as to whether the user has selected or chosen to create a message file 108 containing the verified new messages (step 536). If such a selection has not been made, the process may return to step 508 to permit the user to continue editing messages. If the user has chosen to create a new message file 108, the new message file is created and saved, and a data conformance stamp 416 is created for the message text and any variables included in the new message file 108 as data 408 (step 540). As can be appreciated by one of skill in the art, there are various methods by which a data conformance stamp or digital signature 416 can be created for the message file data 408. For example, the creation of a data conformance stamp may comprise creating a checksum from the data 408. The checksum may then be combined with a hidden key with the result being the data conformance stamp or digital signature 416. Combining the checksum with the hidden key may involve a bitwise exclusive-Or operation. As used herein, "hidden key" refers to the fact that the key used to create the data conformance stamp 416 is hidden from the user of the new message editor application 104, to prevent users from circumventing the format enforcement and verification features provided by the system 100. In addition, other methods for creating a data conformance stamp or digital signature 416 may be used in connection with embodiments of the present invention.

Figure 6:
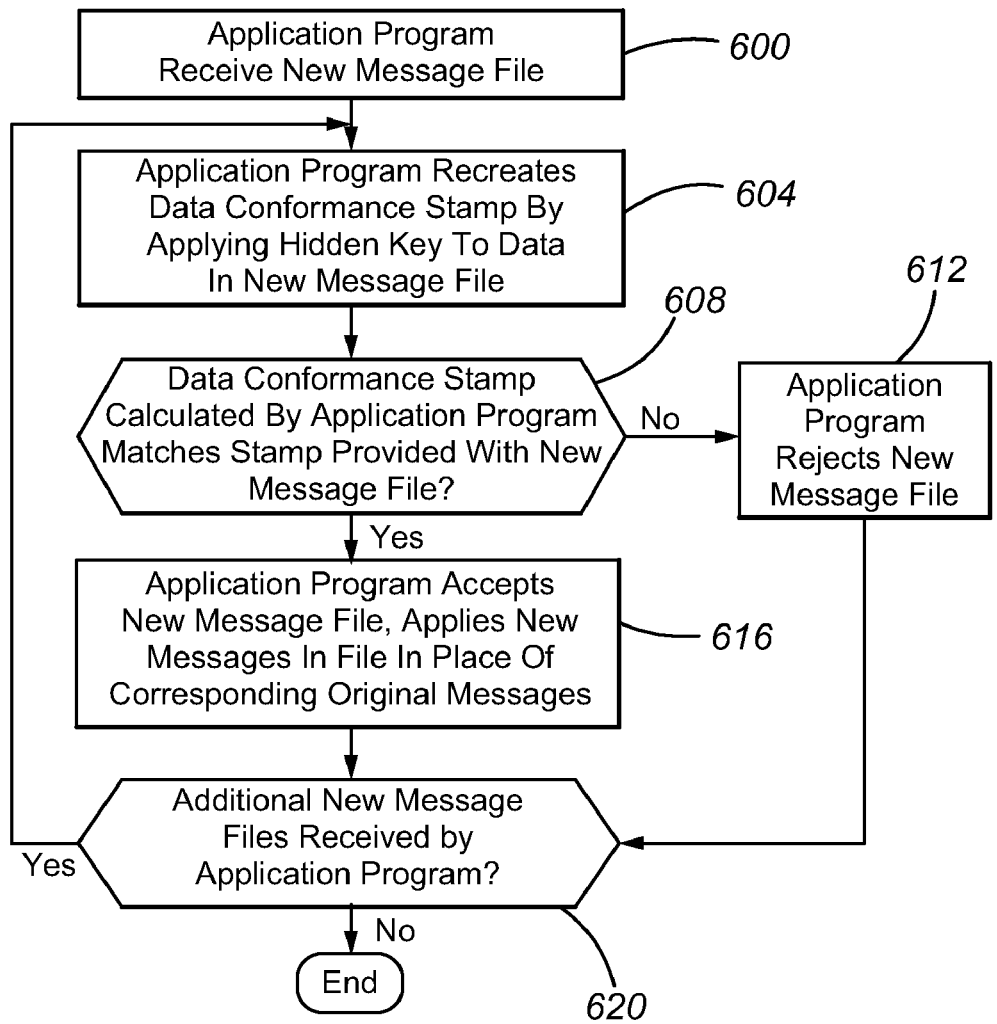
FIG. 6 depicts aspects of a process for receiving a new message file at an application program in accordance with embodiments of the present invention.

With reference now to FIG. 6, aspects of the operation of a system 100 in connection with verifying that a new message file 108 includes valid message data 408 are illustrated. Initially, at step 600, the application program 112 receives a new message file 108 from the new message editor application 104. The application program 112 then recreates the data conformance stamp 416 by applying the hidden key to the data in the new message file 108 as received. More particularly, the new message validation function or module 136 of the application program 112 creates a checksum from the information included in the data section 408 of the new message file 108. The new message validation function 136 then applies the same hidden key that was used by the new message editor application 104 to create the data conformance stamp 416 sent with the new message file 108, to create a data conformance stamp.

At step 608, a determination is made as to whether the data conformance stamp calculated by the new message validation function 136 of the application program 112 matches the data conformance stamp 416 provided with the new message file 108. If the stamps do not match, the application program 112 rejects the new message file 108 (step 612). In particular, if the data conformance stamps do not match, it may be taken as an indication that the contents of the data section 408 of the new message file 108 have been altered outside of the new message editor application 104. Because such alterations will not have been verified by the new message application 104 as complying with the applicable message parameters, application of a message included in new message file 108 for which the data conformance stamp cannot be recreated by the application program 112 may adversely affect operation of the application program 112.

If the data conformance stamp calculated by the application program 112 matches the data conformance stamp 416 received as part of the new message file 108, the data 408 included in the new message file is substituted for the corresponding original messages and applied by the application program 112 at run time (step 616). At step 620 a determination may be made as to whether additional new message files 108 have been received by the application program 112. If an additional new message file 108 has been received, the process may return to step 604. If an additional new message file 108 has not been received, the process may end.

As can be appreciated by one of skill in the art from the description provided herein, message text and any associated variables for a number of messages may be included in a new message file 108. In addition, the data conformance stamp created for a new message file 108 may be based on all or some of the information included in the data section 408 of the new message file 108. For example, in connection with embodiments that use all of the data included in the data section 408 for creation of the data conformance stamp, any changes to information identifying the message, as well as to text and variables associated with that message, can be detected. Accordingly, stability of the application program 112 can better be ensured. However, use of all the information in the data section 408 for creation of a data conformance stamp is not strictly required.

Embodiments of the present invention have particular applicability in connection with enabling distributors, end users and other parties to edit or translate messages used by an application program 112. Furthermore, embodiments of the present invention may be applied in connection with translating text displayed during execution of an application program 112 and as part of an application program's control of a device, such as an embedded device having limited user interface capabilities. In accordance with such embodiments, editing facilities may be provided as part of the new message editor application 104 running on a device, such as a general purpose computer, that is separate from and that may provide enhanced user interface capabilities, as compared to an embedded device running the application program 112. Accordingly, a system 100 in accordance with embodiments of the present invention allows distributors, end users and others to translate messages displayed by telephones and other devices having embedded application program 112 software from the language used by the original developers of that software 112 to a language preferred by the end user.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art are within the scope of the present invention. Embodiments described herein above are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for validating message format, comprising:
   receiving at a message editor application a first and a second new message text, wherein said first and second new message text corresponds to a first and a second message included in an application program, wherein the first and second new message text is displayed to a user during execution of and by the application program, wherein the first new message text comprises a translation of an application message, and wherein the second new message text comprises a second translation to be substituted for the first new message text;
   said message editor application automatically compares that said first new message text conforms to at least a first parameter associated with said first message;
   based on the comparison, said message editor application validating said first new message text;
   creating by said message editor application a first data conformance stamp derived from said validated first new message text;
   associating by said message editor application said first data conformance stamp with said validated first new message text to create a new message file;
   providing said new message file to said application program;
   creating by said application program a second data conformance stamp derived from data included in said second new message file; and
   determining by said application program whether said first data conformance stamp matches said second data conformance stamp.

2. The method of claim 1, further comprising:
   in response to determining that said first data conformance stamp does not match said second data conformance stamp, rejecting said new message file.

3. The method of claim 1, further comprising:
   in response to determining that said first data conformance stamp does match said second data conformance stamp, loading said new message file into said application program.

4. The method of claim 3, wherein said loading said new message file into said application program comprises applying said new message file at runtime of said application program.

5. The method of claim 3, wherein said loading said new message file in to said application program executing on a computer processor comprises substituting text associated with said first message with said first new text.

6. The method of claim 1, wherein said creating a first data conformance stamp by said message editor includes:
   providing a first hidden key to said message editor application;
   creating from said first new message text a first checksum; and
   calculating said first data conformance stamp from said first hidden key and said first checksum.

7. The method of claim 6, wherein said creating a second data conformance stamp by said application program includes:
   providing said first hidden key to said application program;
   creating from said data included in said new message file a second checksum; and
   calculating said second data conformance stamp from said first hidden key and said second checksum.

8. The method of claim 7, wherein said first data conformance stamp is derived from a bitwise exclusive-OR of said first hidden key and said first checksum, and wherein said second data conformance stamp is derived from a bitwise exclusive-OR of said first hidden key and said second checksum.

9. The method of claim 1, wherein a difference between said first data conformance stamp and said second data conformance stamp indicates that said new message text has been altered outside of said message editor application, after said creation of said new message file and before said providing said new message file to said application program.

10. The method of claim 1, wherein said message editor application comprises a message template having at least one fixed parameter for each of a plurality of messages included in said application program.

11. The method of claim 1, wherein said at least a first parameter includes a maximum text length allowed for said first message.

12. The method of claim 1, wherein said at least a first parameter includes required variables included in said first message.

13. The method of claim 1, wherein said at least a first parameter includes a required order of variables included in said first message.

14. The method of claim 1, wherein said new message file created by said message editor includes:
    a header portion containing said first data conformance stamp; and
    a data portion containing said validated first new message text.

15. A non-transitory computer readable medium having stored thereon instructions executable by a computer, the instructions causing the computer to execute a method for translating message files, the instructions comprising:
    instructions to edit messages, including:
        instructions to display an original message text, the original message text associated with a first text message of two or more text messages associated with an application, wherein the first text message text is displayed to a user during and in response to execution of the application and wherein the first text message comprises a translation of an application message;
        instructions to maintain a required parameter associated with said original message text;
        instructions to receive new message text, wherein the new message text comprises a second translation to be substituted for the first text message;
        instructions to compare automatically said new message text with said required parameter associated with said original message text;
        based on the comparison, instructions to determine whether said new message text complies with said required parameter associated with said original message text;
    instructions to calculate a first data conformance stamp for said new message text provided said new message text complies with said required parameter associated with said original message text; and
    instructions to create a new message file, said new message file including said first data conformance stamp and said new message text; and
    instructions to selectively apply messages, including:
        instructions to receive said new message file from said means for editing messages;
        instructions to calculate a second data conformance stamp from said received new message file; and
        instructions to compare said first data conformance stamp to said second data conformance stamp.

16. The system of claim 15, wherein the instructions to selectively apply messages further include:
    instructions to substitute said new message text included in said received new message file for text associated with a corresponding original message text in response to said means for comparing determining that said first and second data conformance stamps match.

17. The system of claim 15, wherein said instructions to display text associated with a plurality of messages, and wherein said means for maintaining maintains a required parameter for each of said plurality of messages.

18. The system of claim 15, wherein said original message text comprises text in a first language and wherein said new message comprises text in a second language.

19. The system of claim 15, wherein said required parameter comprises at least one of a maximum message length, a required variable and a required variable order.

20. The system of claim 15, wherein said instructions to edit are associated with a general purpose computer and wherein said instructions to selectively apply messages are associated with an embedded device.

* * * * *